May 10, 1955 W. GOODMAN 2,707,868
REFRIGERATING SYSTEM, INCLUDING A MIXING VALVE
Filed June 29, 1951 6 Sheets-Sheet 1
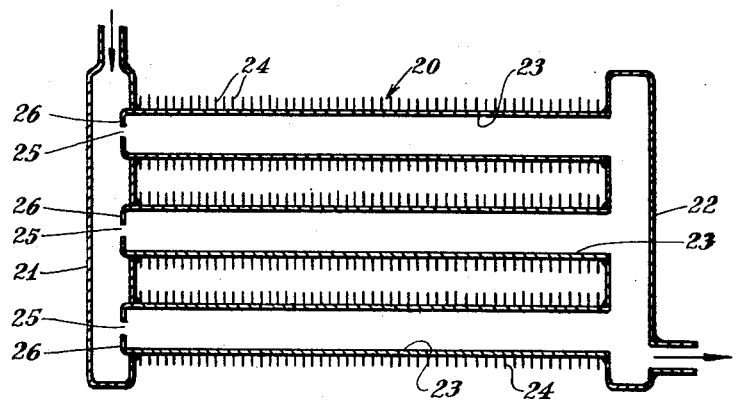
Fig. 1
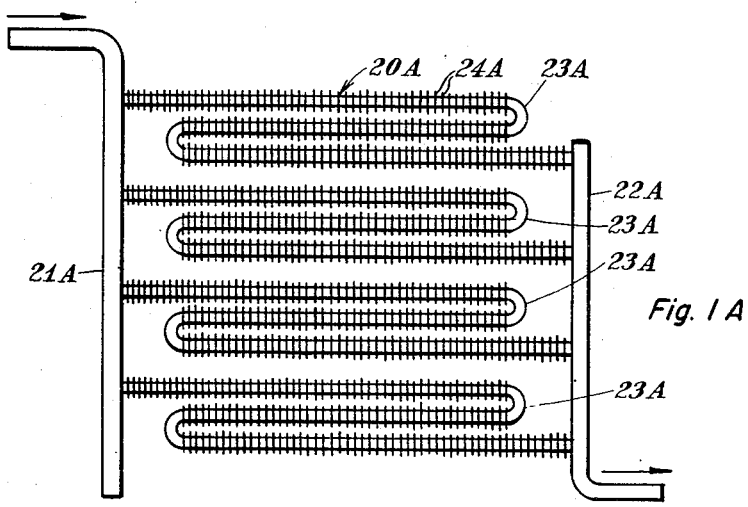
Fig. 1A
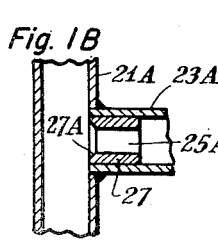
Fig. 1B  Fig. 1C
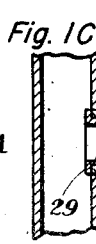
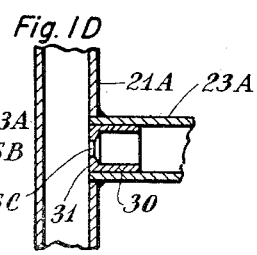
Fig. 1D
INVENTOR.
WILLIAM GOODMAN
BY
Wallace and Connor
ATTORNEYS

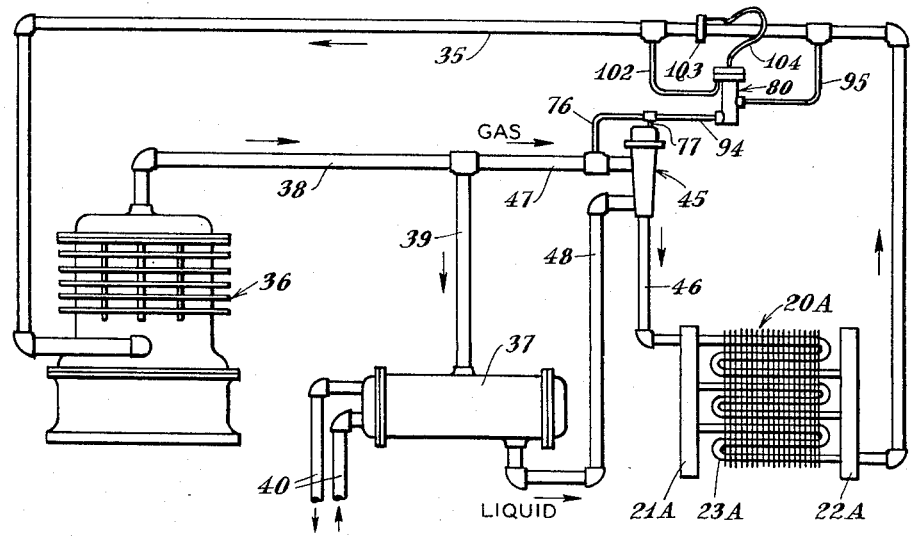
Fig. 2
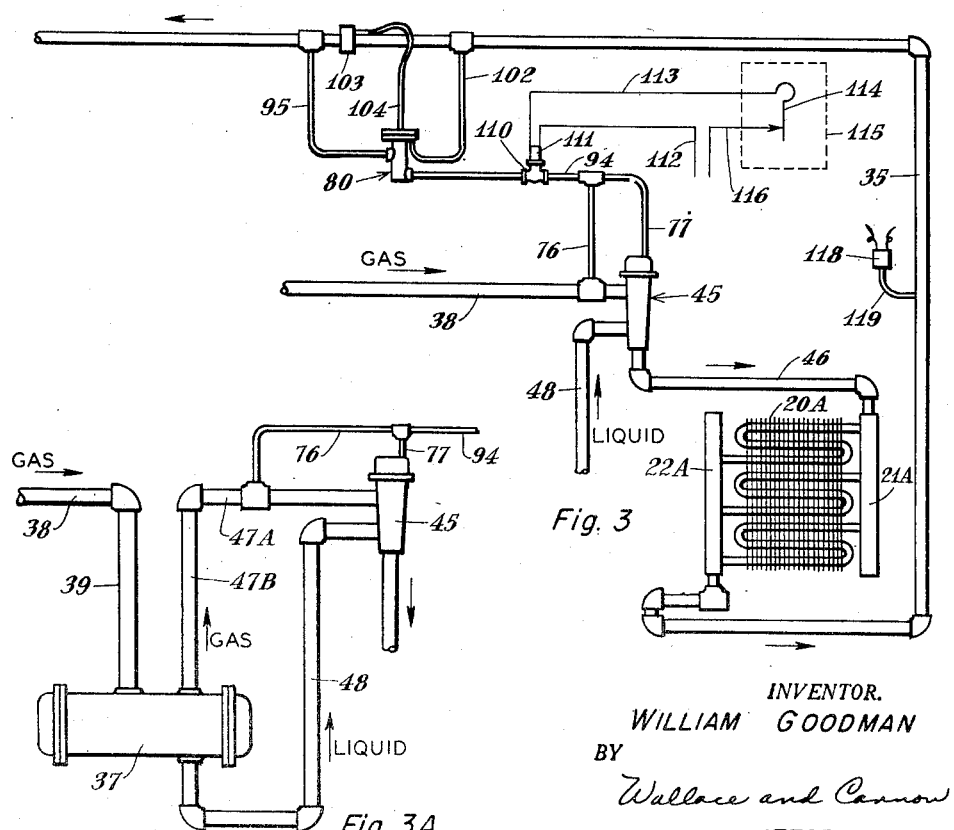
Fig. 3
Fig. 3A
INVENTOR.
WILLIAM GOODMAN
BY
Wallace and Cannon
ATTORNEYS

INVENTOR.
WILLIAM GOODMAN

INVENTOR.
WILLIAM GOODMAN

United States Patent Office 2,707,868
Patented May 10, 1955

2,707,868

REFRIGERATING SYSTEM, INCLUDING A MIXING VALVE

William Goodman, Chicago, Ill.

Application June 29, 1951, Serial No. 234,403

17 Claims. (Cl. 62—4)

This application is a continuation-in-part of my copending application Serial No. 675,035, filed June 7, 1946, now abandoned.

This invention relates to refrigeration and particularly to the control of the evaporating phase in the refrigerating cycle.

In accordance with usual practice in the refrigeration art it is customary to pass the liquid refrigerant through an expansion valve or its equivalent and into the distributing supply header of an evaporator that serves as the heat transfer means for effecting the desired cooling of air or other fluid that is passed over the heat transfer surfaces of the evaporator. Such an evaporator ordinarily comprises supply and return headers connected by a plurality of evaporating or heat transfer tubes, that may in many instances take the form of return-bend coils, and the rated cooling capacity of such an evaporator is based upon the attainment of an efficient evaporating action or operation in respect to all of the evaporating or heat transfer tubes of the evaporator. While proper operation of the evaporator is usually attained when operating at full or rated capacity, it is recognized in the industry that where an evaporator is being operated at partial capacity an even distribution of liquid refrigerant among the several evaporating tubes of the evaporator is very rarely obtained, and to overcome this inherent difficulty or limitation in refrigerating systems is the primary object of the present invention.

Thus it has been found that such unequal distribution of liquid refrigerant among the several evaporating tubes of the evaporator often results in at least some of the evaporating tubes being substantially dry so that only a part of the tubes of an evaporator function as heat-absorbing means, and hence the air or other fluid that is being passed over the tubes of the evaporator will be inadequately and in many instances unevenly cooled. It is therefore a further and more specific object of the invention to enable uniform distribution of liquid refrigerant to be attained in the tubes of an evaporator, thereby to enable proper operation of the evaporator to be readily attained and cause efficient and uniform cooling of the air or other fluid that is being passed over the heat absorbing tubes of the evaporator at partial load as well as at full load.

One important factor that contributes to such unequal distribution of the liquid refrigerant in the evaporator of conventional refrigerating systems is the low pressure that is necessarily employed in the distributor or distributing header in conventional systems, such low pressure being the result of the large pressure drop at the expansion valve, and where there is such a low pressure in the distributing header, the pressure drop between such header and the tubes is so low that even when the evaporator is operating at full load, the feed of liquid refrigerant from the supply header to the evaporating tubes is caused primarily by gravity rather than by pressure. The low pressure that is thus utilized in the evaporator under full load conditions is even further reduced as the refrigeration load is decreased, and the pressure differential between the distributing header and the tubes drops off very rapidly as the flow of liquid is reduced by the expansion valve. It is recognized that the effective pressure differential varies as the square of the weight of liquid flow, and as an example it will be clear that where flow is reduced by one-half due to a change in load, the pressure differential will be reduced by seventy-five percent. Consequently, a distributor which will satisfactorily distribute the liquid at full load with an adequate pressure difference, will produce only erratic distribution at partial loads, because the reduction in liquid flow by the expansion valve results in a large reduction in pressure differential between the distributor and the tubes of the evaporator. Hence the problems of distribution within the evaporator are further aggravated as the load is decreased. The uneven distribution that is thus encountered in operating conventional refrigerating systems at partial load has long been recognized as being undesirable, and attempts have been made to correct this condition. One such attempt to attain equal distribution of the liquid refrigerant has involved the use of a distributing chamber serving the function of a distributing header, and to which refrigerant is supplied from the expansion valve, and individual distributor lines in the form of metering restrictions, capillary tubes or the like, and acting as orifices, have been extended from the distributing chamber to each of the respective tubes of the evaporator. The operation of such devices insofar as distribution is concerned is of course dependent upon the pressure in the distributing chamber, and because most of the available pressure drop has taken place at the expansion valve, such distributors are ineffective to produce equality of distribution under varying load conditions. It is therefore an important object of the present invention to enable substantially full condenser pressure to be employed for feeding the liquid refrigerant through the supply header and into the evaporating tubes of the evaporator, thereby to eliminate reliance upon gravity feed and reliance on small pressure differences, and to thereby attain substantially uniform distribution of refrigerant in the evaporating tubes of the evaporator at all loads.

The necessity for reliance on low pressures or on gravity feed within the evaporator in conventional refrigerating systems also adversely affects the efficiency or capacity in another way in that the liquid refrigerant flows only along the bottom surfaces of the tubes, while large portions of the internal surfaces of the tubes remain dry, or unwetted by the refrigerant. Thus the heat transfer action from the metal of the tubes to the liquid refrigerant is confined to the bottom areas of the tubes that are wetted by the liquid refrigerant, so that full utilization is not made of the available heat transfer surfaces of the tubes. It is therefore a further object of the present invention to afford a system wherein wetting of the entire inner surface of the evaporating tubes by the liquid refrigerant is attained so as to cause high efficiency of heat transfer and evaporation of liquid refrigerant, and an object related to the foregoing is to afford a system wherein such complete wetting of the internal surfaces to be attained in a way such that there is movement of liquid refrigerant along and about the internal tube surfaces at a substantial velocity so as to attain a vigorous scrubbing action that will cause efficient heat transmission between the metal of the tubes and the liquid refrigerant.

In accordance with the present invention the refrigerant is fed to the supply or distributing header of the evaporator at substantially the full condenser pressure, thereby eliminating the usual expansion valve or equivalent pressure reducing means, so that relatively high pressure refrigerant is fed to the metering inlets of all of the evaporator tubes, and thus under the present invention, the metering inlets, such as orifices, nozzles, needle valves, capilary tubes or the like, for the respective evaporating tubes are subjected to the relatively high condenser pressure at all times and hence the flow of the refrigerant into the respective tubes is accurately governed and the desired equality of distribution is attained.

In practice it will be recognized that the load on the evaporator may vary considerably so as to render it desirable to vary the supply of liquid refrigerant in accordance with such variations, and to enable this to be accomplished while at all times maintaining substantially condenser pressure at the inlet orifices of the evaporating tubes is a still further object of the invention. In prior refrigerating systems such variation in the supply of liquid refrigerant has been accomplished by adjustment of the expansion valve, but as hereinbefore pointed out, this expedient has resulted in unequal distribution of liquid refrigerant in the respective evaporating tubes, and it is therefore a further object of the present invention to eliminate such expansion valve and yet enable variable supply of liquid refrigerant to the evaporator in accordance with the refrigeration load to be attained while maintaining the pressure in the supply or distributing header substantially at condenser pressure under all conditions of load or output. It is known that for a given refrigerant pressure the rate of flow, measured by weight, of refrigerant through a restriction such as an orifice of a given size is affected and governed by the presence of refrigerant vapor mixed with the liquid refrigerant, so that the flow, by weight, through such an orifice will be reduced as the proportion of refrigerant vapor is increased; and under one embodiment of the present invention this phenomenon is utilized to govern the supply of refrigerant to the evaporating tubes of the evaporator. Thus it is a further and more specific object of the present invention to enable the uniformity of distribution of refrigerant in the evaporator of a refrigerating system to be maintained by control and variation of the vapor-liquid ratio of the refrigerant supplied to the evaporator.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a sectional view illustrating a multi-tube evaporator;

Fig. 1A is an elevational view of another evaporator having a plurality of return-bend evaporating tubes;

Figure 2A:
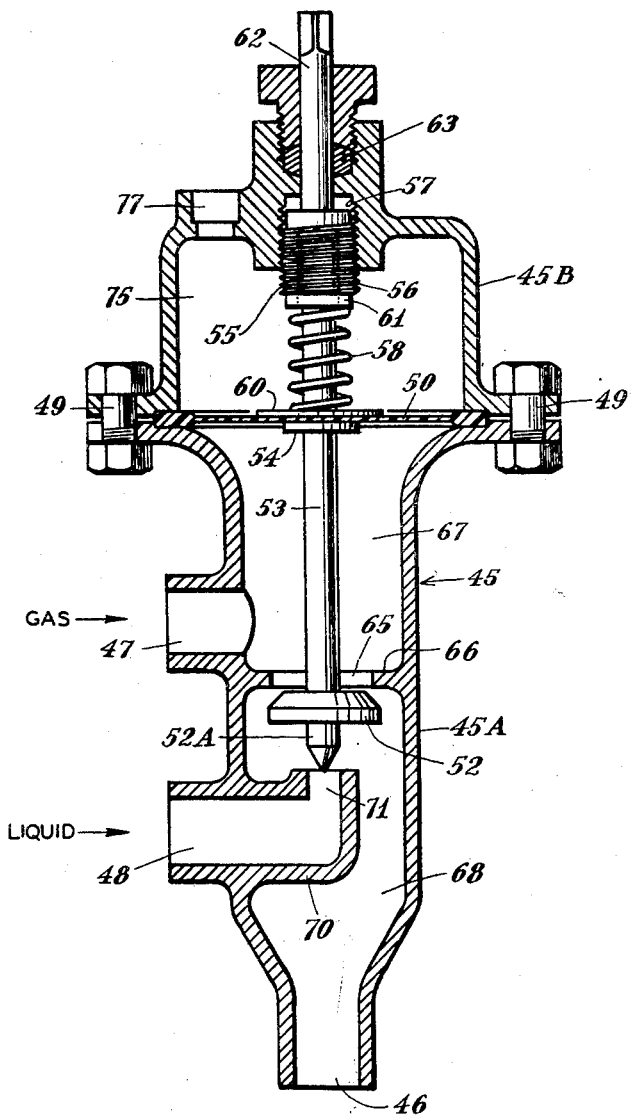
Figure 4:
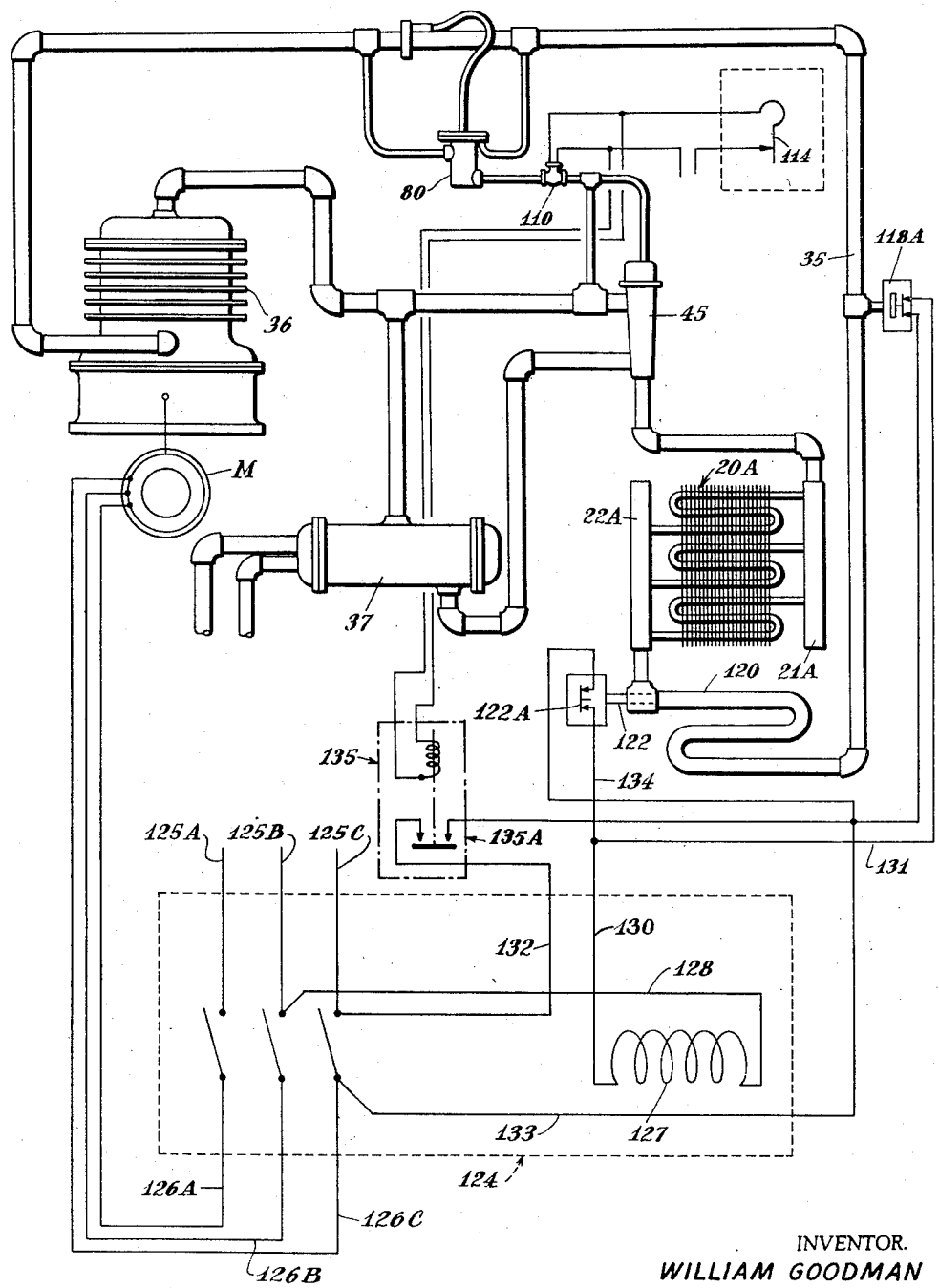
Figure 4A:
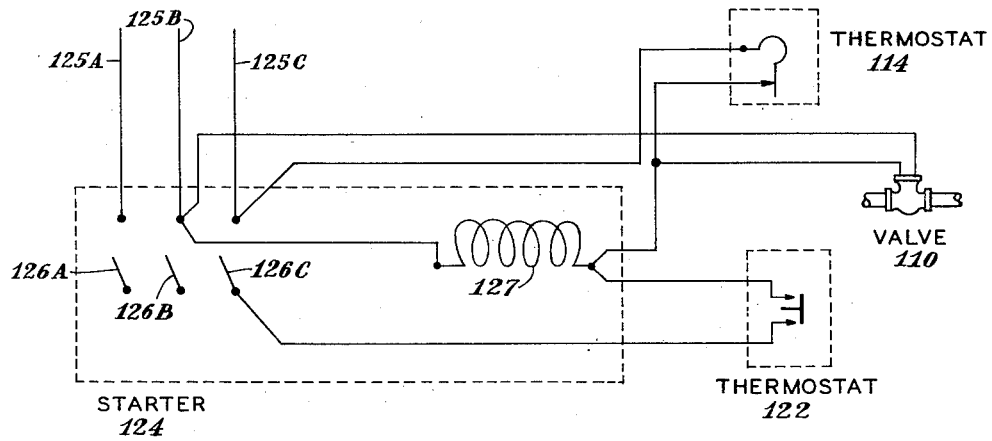
Figure 5:
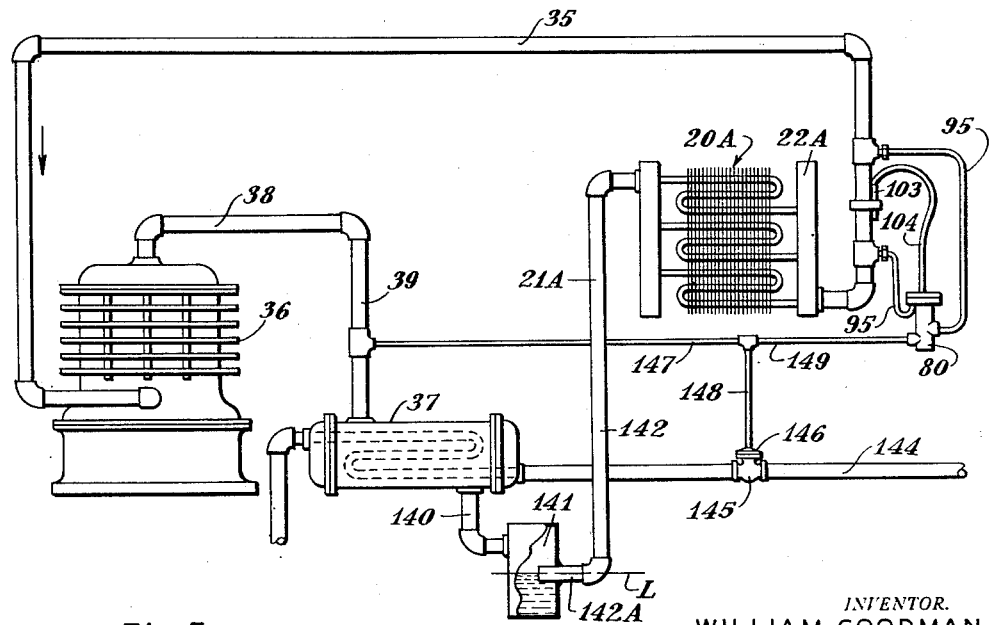
Figure 6:
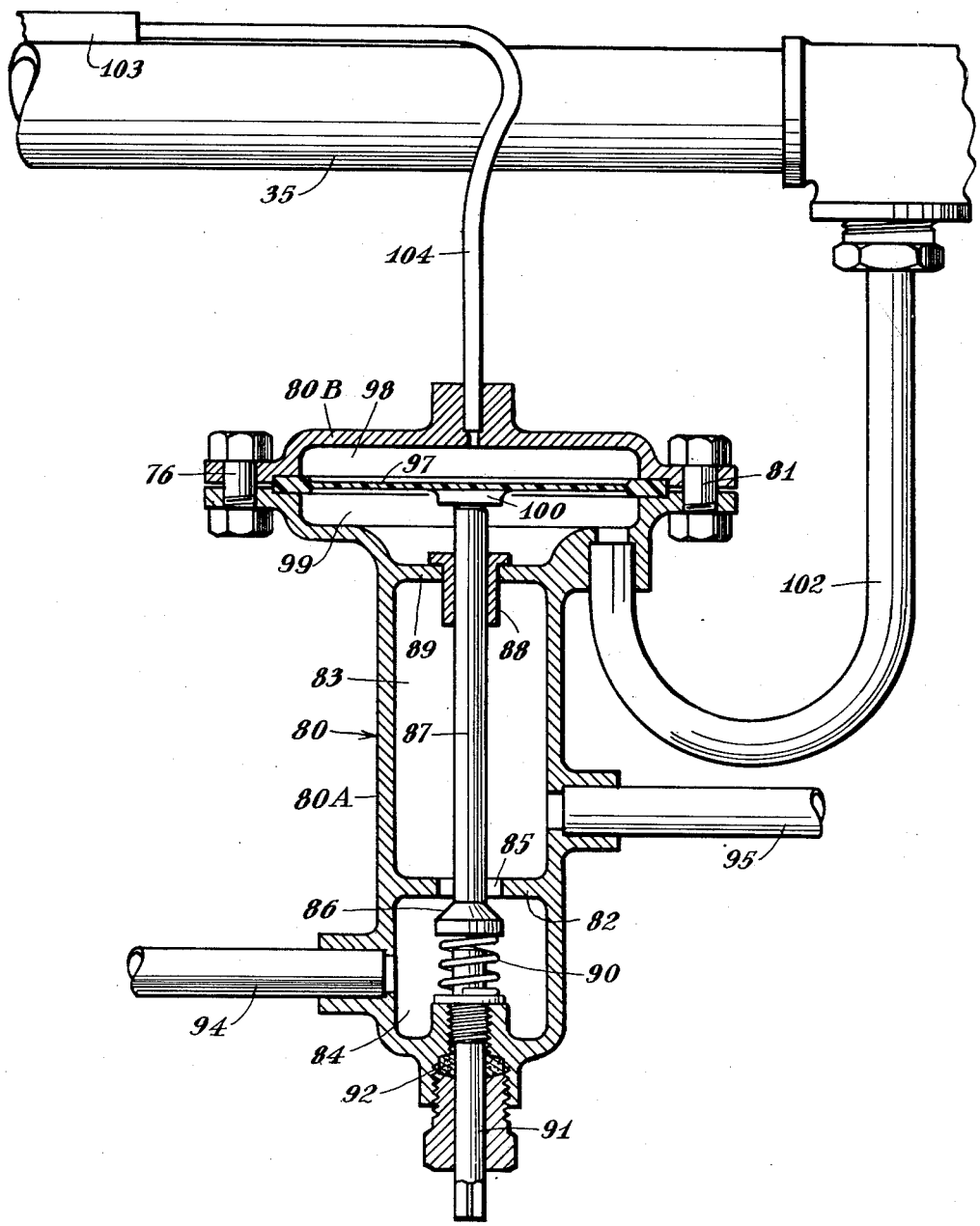

Figs. 1B, 1C, and 1D are fragmentary sectional views illustrating different ways in which the metering restrictions or orifice may be afforded for the tubes of the evaporator shown in Fig. 1A;

Fig. 2 is a diagrammatic view illustrating a refrigerating system embodying the features of the invention;

Fig. 2A is a sectional view of a mixing valve utilized in the refrigerating system of Fig. 2;

Fig. 3 is a fragmentary view illustrating another refrigerating system embodying the features of the invention;

Fig. 3A is a fragmentary view illustrating another manner of connecting the elements of the refrigerating system shown in Figs. 2 and 3;

Fig. 4 is a diagrammatic view illustrating another way in which the refrigerating system of Fig. 3 may be utilized;

Fig. 4A is a diagrammatic view illustrating a modification of the system of Fig. 4;

Fig. 5 is a diagrammatic view illustrating a refrigerating system wherein the liquid-vapor ratio of the refrigerant is controlled in a different manner; and Fig. 6 is a sectional view of a control valve used as a pilot control in the system herein shown.

For purposes of disclosure the present invention is illustrated herein in three basic forms or embodiments so as to demonstrate the wide field of application of the invention to the varying conditions or requirements encountered in use. It will be observed that in all of these basic examples or embodiments of the invention, the refrigerant is distributed among the several evaporating tubes by feeding the refrigerant at substantially condenser pressure to a plurality of restricted distributing passages or orifices that communicate in parallel with the respective evaporating tubes so as to thereby operate at all times under high pressure conditions which insure accurate metering action of the restrictions or orifices and hence produce uniform distribution of the refrigerant among the several evaporating tubes.

In all of the embodiments, or forms of the invention, the distribution of the refrigerant among the evaporating tubes of the evaporation is attained through the use of metering restrictions or orifices affording communication between a high pressure distributing chamber or header and the respective evaporating tubes of the evaporator, and this may be conveniently accomplished in a unitary structure of the character shown in Figs. 1 or 1A wherein the high pressure distributing chamber is afforded in direct physical association with and as a part of the evaporator unit. Thus in Fig. 1 of the drawings an evaporator 20 is illustrated having a distributing supply header 21 and a return header 22 connected in parallel by a plurality of evaporating tubes 23, such tubes 23 having conventional heat transfer fins 24 associated therewith. At their inlet ends the evaporating tubes 23 have metering restrictions formed therein as orifices 25, these orifices being afforded in the present instance by extending the tubes 23 into the interior of the header 21 and flanging these ends radially inwardly as at 26 to form the restrictions or orifices 25. The orifices or restrictions 25 are of such a size that at substantially condenser pressure in the distributing supply header, liquid refrigerant will be fed to the several evaporator tubes in an equal distribution and in a proper relation to the evaporating capacity of the tubes. The tubes 23 of the evaporator 20 are illustrated as being straight, but it will of course be recognized that return-bend coils may serve as evaporating tubes as for example in the evaporator 20A illustrated in Fig. 1A. The evaporator 20A has a distributing supply header 21A and a return header 22A, and these headers are connected by a plurality of evaporating tubes 23A that are in the form of return-bend coils. The tubes 23A have heat transfer fins 24A associated therewith in a conventional manner, and the respective tubes 23A are associated with the distributing or supply header 21A by restricted openings or orifices such as those shown in Figs. 1B to 1D. Thus in Fig. 1B, a sleeve 27, having a bore 25A therethrough, is secured in each tube 23A at the inlet end thereof, the end of the bore 25A adjacent the supply header being tapered as at 27A, and the bore 25A serving to afford a metering restriction or orifice. In Fig. 1C, a cup shaped member 28 is disposed within the inlet end of the tube 23A so that a flange 29 on the open end of the member engages the end of the tube 23A, and a perforation 25B in the bottom or end wall of the member 28 affords the desired metering orifice a restriction. In the form illustrated in Fig. 1D, a sleeve 30 is disposed within the inlet end of the tube 23A, and an inturned flange 31 at the inlet end of the sleeve 30 serves to define a metering restriction 25C.

In the first of the embodiments of the invention, the multi-circuit evaporator 20A is illustrated in Fig. 2 as included in a refrigerating system having a return pipe 35 connecting the return header 22A to the intake of a conventional compressor 36, and the compressed output of the compressor 36 is fed to the distributing supply header 21A through means including a condenser 37. Thus a pair of pipes 38 and 39 are extended in series from the output side of the compressor 36 to the condenser 37, thereby to convey the hot compressed gaseous refrigerant to the condenser 37. Within the condenser such compressed gaseous refrigerant is condensed into liquid form by cooling means including water circulating pipe 40. In this embodiment of the invention the rate at which refrigerant is supplied to the evaporator 20A is governed in accordance with the refrigerating load on the evaporator to thereby feed liquid refrigerant to the evaporator at a rate that corresponds with the rate at which such refrigerant may be evaporated, and this is accomplished in such a way as to maintain substantially condenser pressure in the distributing header 21A at all times. This of course insures even distribution of the refrigerant because of the accurate metering of the refrigerant by the metering restrictions or orifices as 25A. The desired variable control of the rate of supply of refrigerant to the evaporating tubes 23A is, in the embodiment shown in Fig. 2, accomplished by supplying the refrigerant to the distributing header 21A in the form of a mixture of refrigerant vapor or gas with liquid refrigerant. Mixing means are therefore provided for supplying such a liquid-vapor mixture to the distributing header 21A, and in the embodiment illustrated in Fig. 2, such mixing means take the form of a mixing valve 45, the output side of which is connected by a pipe 46 to the distributing header 21A of the evaporator, and the mixing valve 45 has a gas or vapor supply connection afforded by a pipe 47 extended from the pipe 38, and a liquid supply connection afforded by a pipe 48 extended from the output side of the condenser 37.

The mixing valve 45 is shown in detail in Fig. 2A of the drawings wherein it will be evident that a sectional casing is afforded having a lower section 45A and an upper section 45B that are appropriately flanged and secured together by bolts 49. Within the casing of the valve 45A and 45B of the casing, a diaphragm 50 is clamped between the two sections, and the diaphragm 50 is utilized in the present instance as an operating means for a valve member 52. Thus as will be evident in Fig. 2A, the valve member 52 is mounted on a valve stem 53 that extends through the diaphragm 50 and has a shoulder 54 formed thereon beneath such diaphragm. Above the diaphragm 50 the valve stem 53 extends into a guide bore 55 formed in a guide sleeve 56 that is threaded into a socket 57 formed in the upper portion of the casing section 45B. An expansive coil spring 58 surrounds the stem 53 above the diaphragm 50 and acts at its opposite ends against washers 60 and 61, thereby to press the valve member 52 downwardly, and the action of the spring in this respect may be adjusted by means of the threaded sleeve 56. Thus the sleeve 56 has an axial stem 62 fixed thereto and extended through the wall of the casing section 45B, there being a conventional sealing gland 63 about such stem 62.

The valve member 52 is disposed beneath a valve opening 65 formed in a transverse division wall 66 that is provided in the casing section 45A, and the opening 65 may thus be closed by upward movement of the valve member 52. The gas or vapor inlet 47 is arranged to open into a chamber 67 that is afforded in the casing section 45A between the wall 66 and the diaphragm 50, and hence the valve member 52 may by its vertical movement control the flow of gaseous refrigerant downwardly from the chamber 67 and through the opening 65 into a lower chamber 68 that is afforded between the wall 66 and the lower end or outlet 46 of the valve. The valve member 52 also serves in its vertical movement to adjust and control the flow of liquid refrigerant from the inlet or supply line 48 into the chamber 68. Thus the valve section 45A has an internal elbow 70 formed as a continuation of the liquid inlet 48 so as to extend into the chamber 68, and the inner end of the elbow 70 terminates in an upwardly directed valve opening 71 that is coaxial with the opening 65. The valve member 52 is formed with a downward extension 52A that is tapered at its lower end for cooperation as a valve member with a valve opening 71, and hence when the valve stem 53 is moved downwardly so as to open the valve opening 65, the valve opening 71 is progressively closed. It will be clear therefore that the valve openings 65 and 71 are varied in an opposite sense as the valve stem 53 is moved, and thus the proportions of gaseous and liquid refrigerant that are mixed in the valve 45 may be governed by adjusting the position of the valve stem 53. The adjustment or variable setting of the valve 45 is attained by power means that includes the diaphragm 50, and for this purpose the pressure of the high pressure refrigerant is utilized in the present instance. Thus, the gaseous refrigerant within the chamber 67 acts on the diaphragm 50 to tend to move the valve stem 52 upwardly against the spring 58, while the high pressure, either as gas or liquid, is also applied in a controlled manner to the upper face of the diaphragm 50 to govern the position of the valve stem. Thus a chamber 75 is formed within the casing section 45B and above the diaphragm 50, and this chamber is connected by a relatively small or restricted pipe 76 and a larger pipe 77 to the gas line 47. The full condenser pressure of the gaseous refrigerant is thus under static conditions applied to both faces of the diaphragm 50 so that by bleeding off a portion of such pressure on the upper face of the diaphragm 50, the effectiveness of the spring 58 may be varied and the position of the valve member thereby controlled and varied.

Such control of the mixing valve 45 is attained by a thermal expansion valve 80, shown in detail in Fig. 6 of the drawings, and this valve has a sectional casing affording sections 80A and 80B that are appropriately flanged and secured together by bolts 71. The casing section 80A has a division wall 82 formed therein to afford upper and lower chambers 83 and 84, and the wall 82 has a valve orifice 85 formed therein. The valve orifice 85 is controlled by a vertically movable valve member 86 disposed beneath the orifice 85 and carried on a valve stem 87 that extends upwardly through a sealing sleeve 88 mounted in an upper wall 89 of the valve member 83. Within the valve chamber 84 an expansive coil spring 90 acts on the valve member 86 to urge the same to its closed position, and an adjusting stem 91 is extended into the chamber 84 through a packing gland 92 for adjusting the action of the spring 90. The chamber 84 is connected by a pipe 94 to the pipe 77, while a pipe 95 extends from the chamber 83 to the return line 35, as will be evident in Figs. 2 and 9. Thus the pressure in the chamber 75 of the mixing valve 45 may be bled off in varying amounts by varying the position or setting of the valve member 86.

The control of the valve 80 is in the present instance accomplished in response to the superheat of the refrigerant in the return line 35, and for this purpose means is provided in association with the valve stem 87 to respond to such superheat and correspondingly actuate the valve of steam 87. Thus in the clamping of the valve sections 80A and 80B, a diaphragm 97 is clamped in position between the two sections, and this diaphragm cooperates with the sections of the casings to afford upper and lower chambers 98 and 99. The lower face of the diaphragm 97 has a boss 100 formed thereon that bears against the upper end of the stem 87, and hence, the diaphragm 97 may act downwardly against the stem 97 in opposition to the action of the spring 90. The diaphragm 97 is positioned in accordance with the superheat of the refrigerant in the return line by applying the pressure from the return line 35 to the lower face of the diaphragm 97 and by actuating the diaphragm downwardly in accordance with the temperature of the refrigerant in the return line. Thus a pipe 102 is extended from the return line 35 to the lower chamber 99, thereby to apply the refrigerant pressure from the return line to the lower face of the diaphragm. The other, or upper face of the diaphragm 97 has pressure applied thereto by thermally responsive means that include a temperature responsive element 103 associated with the return line 35 and connected by the tube 104 to the upper chamber 98. The element 103 and the tube 104 having an expansive liquid therein which will vaporize and expand in response to the temperature that is applied to the element 103. Thus the diaphragm 97 is positioned or actuated in accordance with the superheat of the refrigerant in the return line 35, and this operation of the diaphragm 97 serves through the valve member 86 to control the positioning of the valve member of the mixing valve 45.

Assuming for purposes of illustration that less refrigerant is being fed to the evaporator 20A than is required by the cooling load thereon, it will be recognized that this will increase the superheat of the refrigerant in the return line 35. As a result of this increase in the superheat, the diaphragm 97 will be moved downward, thereby to further open the valve 80. Such increase in the effective opening of the valve 80 will cause an increased bleeding of the pressure from the upper chamber 75 of the valve 45, and the diaphragm 50 of the mixing valve will therefore move upwardly. This will of course serve to increase the supply of liquid refrigerant and decrease the supply of gaseous refrigerant to the distributing header 22A of the evaporator. It will be evident of course that despite this change in the liquid-vapor ratio of the mixture, the pressure in the distributing header 22A will be maintained at substantially condenser pressure so that equality of distribution of the refrigerant to the various evaporating tubes 23A will be maintained. Such a supply of increased percentage of liquid refrigerant will of course tend to reduce the superheat in the return line so that the valve system will become stabilized at a setting such that the amount of refrigerant, by weight, that is fed to the evaporator will correspond with the amount of liquid refrigerant that can be evaporated under the load that is being applied to the evaporator.

Where the refrigerant is thus fed to the evaporator tubes as a mixture of vapor and liquid, it affords a gas-liquid dispersion which in some proportions may constitute a foam while in other proportions it may constitute a mist or fog in that atomized droplets or particles of liquid refrigerant are entrained in the gaseous refrigerant. Such gas-liquid dispersion in either instance fills the entire tube so that the entire inner surface of the tube is wetted and will act as an efficient heat transfer surface. The behavior of the refrigerant within the tube is such as to attain a vigorous scrubbing action that aids such heat transfer. In this regard it will be evident that the large volume represented by such a mixture will of necessity flow quite rapidly in the tube, and the liquid will because of its density be deposited on the inner surface of the tube. Such deposited liquid will of course be vaporized and the resulting vapor will pass toward the center of the tube. Thus there is constant movement of the refrigerant within the tube that constitutes a scrubbing action and insures efficient evaporation of the liquid refrigerant.

The system that has been illustrated in Fig. 2 is one wherein the valve 45 and the valve 80 cooperate to govern the supply of refrigerant to the evaporator 20A in accordance with the load that is impressed upon the evaporator, and under the present invention, the valve system that includes the valves 45 and 80 may also be governed by a secondary control that is responsive to the ultimate cooling action of the system, as for example, in an instance where the system is being used to cool an air enclosure or a liquid such as water. In such an instance, it may be desirable to control the temperature of the air or water so as to establish or maintain the same within predetermined limits. Thus, in Fig. 3 of the drawings, a refrigerating system is disclosed that is in most respects similar to Fig. 2, and corresponding reference characters have been used in Fig. 3 for corresponding elements of structure. In the system illustrated in Fig. 3, however, the pipe 94 that connects the pipe 77 with the valve 80 has a control valve 110 interposed therein. This valve 110 may be of the modulating type, or may be of the on-off type as herein shown. Where an on-off type of valve is utilized, it is of the character that is normally closed, and is arranged to be opened by means such as a solenoid 111. The solenoid 111 has one terminal thereof connected by a wire 112 to one side of an electrical source while a wire 113 connects the other side of the solenoid to one terminal of a thermostat 114 that is disposed in operative association with the compartment such as an air or water compartment 115 that is being cooled by the evaporator 20A. The other terminal of the thermostat 114 is connected by wire 116 to the other side of the current source, and the arrangement is such that when the desired minimum temperature is attained, the thermostat 114 will open and thereby de-energize the solenoid 111. This causes the valve 110 to close, and further bleeding action through the valve 80 is stopped. As a result of such closure of the valve 110, the full condenser pressure from the line 38 becomes effective upon the upper face of the diaphragm 50, Fig. 2A, and this pressure balances against the full condenser pressure that is applied in the chamber 67 below the diaphragm. The spring 58 therefore becomes effective to fully open the orifice 65, and to close the orifice 71. This results in feeding hot refrigerant gas to the distributing header 21A of the evaporator, and the cooling action of the evaporator 28 is thereby terminated. When hot vapor is thus supplied to the distributing header of the evaporator, there is a resulting drop in the pressure in the evaporator which of course carried over into the return line 35, and this action may be utilized to stop the operation of the compressor 36. Thus a pressure switch 118 may be connected by a pipe 119 to the return line 35, and this pressure switch may be arranged to open the motor circuit of the motor which drives the compressor 36.

To prevent the compressor from cycling on and off after shut-down from the low-pressure switch, an additional relay not shown in Fig. 3, but well-known in the art is wired into the electrical circuits of thermostat 115 and pressure switch 118. In this case, the pressure switch can start the compressor only if the switch contacts of thermostat 114 are closed.

However, the pressure switch 118 shown in Fig. 3 and the additional relay mentioned in the foregoing paragraph are not necessary to the functioning of the system. They can be omitted. Without the pressure switch 118, the compressor is started and stopped by means of the same thermostat 114 which operates valve 111. This is a well-known method in the art.

It will be observed in Figs. 2 and 3 that the source of hot compressed refrigerant gas for the mixing valve 45 is afforded by direct connection of the pipe 47 to the discharge pipe 38 of the compressor, but such a source of hot compressed gas may be afforded by connection with the condenser 37 at a point where gas may be withdrawn prior to the time when the condensation of the gas takes place. Such an arrangement is illustrated in Fig. 3A of the drawings where it will be observed that the hot gas connection for the mixing valve 45 is afforded by a pipe 47A and a pipe 45B that are extended in series from the gas inlet of the mixing valve 45 to the compressor 37. Thus the gas in this instance passes through the upper portion of the condenser 47 from the pipe 39 and into the pipes 47A and 47B, thereby to supply hot compressed gas to the mixing valve 45 in substantially the same manner as hereinbefore described with respect to Figs. 2 and 3.

In the embodiment of the invention shown in Fig. 3, the secondary control valve 110 is introduced into the line 94 so as to enable the supply of liquid refrigerant to the evaporator 26A to be entirely cut off when the cooling action exceeds the desired maximum, and this control valve 110 may also be utilized in a refrigerating system wherein provision is made for automatic defrosting of the evaporator 20A each time the valve 110 is closed. Such a refrigerating system is illustrated in Fig. 4 of the drawings, and in most respects this system embodies the same elements as those shown in Fig. 3, and corresponding reference characters are employed for such corresponding elements. In the system of Fig. 4, however, the return header 22A of the evaporator is connected to the return line 35 by a supplemental evaporating coil 120 so that any liquid refrigerant that is condensed within the evaporator 20A in the course of the defrosting cycle may be evaporated at a point where it does not cause an objectional cooling action, thereby to return the refrigerant to the return line 35 in a gaseous state.

In addition the relay 135, operated by thermostat 114, is arranged to open the line 132 when the thermostat 114 opens its contacts.

In the embodiment of the invention shown in Fig. 4 of the drawings, a pressure switch 118A is associated with the return line 35, and is so arranged as to open upon a reduction of pressure in the return line. Between the return header 22A and the supplement evaporating coil 120, a thermostat 122 is associated with the piping, and this thermostat is arranged to close an associated switch 122A when the temperature in the return line decreases below a predetermined figure, and to open when the temperature in the return line increases. The switch element of the pressure switch 118A is arranged so that closure of the pressure switch 118A will function in the control of the motor that drives the compressor 36, and such control is attained through a starting switch 124. The starting switch 124 has the switch elements thereof interposed in a three phase power line having supply wires 125A, 125B and 125C, and when the switch elements of the starter 124 are closed, circuit is extended to the wires 126A, 126B and 126C that are extended to the motor M that drives the compressor. An operating solenoid 127 is provided for the switch elements of the starter 124, and the switch elements are maintained closed so long as the solenoid 127 is energized. One terminal of the solenoid 127 is connected by wire 128 to the supply wire 125B, and when the starter switch 124 is to be initially closed, circuit is extended to the wire 125C from the other terminal of the solenoid 127 under control of the pressure switch 118A, and the thermostat 122A. Thus wires 130 and 131 are extended in series from the other terminal of the solenoid 127 to one contact of the pressure switch 118A through the relay 135, and a wire 132 is extended from the other contact of the switch 135A to the wire 125C. Hence, if the thermostat 114 has energized the relay 135 to close the relay contacts 135A, upon closing of either the thermostat 122 or the pressure switch 118A, the solenoid 127 will be energized and the starter switch 124 will be closed so as to start the motor that operates the compressor 36. The thermosat 122 has a termostatically operated switch 122A associated therewith and this switch is arranged to be opened upon an increase of temperature in the return header 22A, and to be closed when the temperature in the header 22A is reduced. The switch 122A serves to maintain the solenoid 127 energized during the defrosting operation, and one contact of the switch 122A is connected by a wire 133 to the wire 126C. The other contact of the switch 122A is connected by wire 134 to the wire 130 so that once the solenoid 127 is energized, the thermostatic switch 122A may serve to hold the solenoid 127 energized even though the pressure switch 118A is open. Thus with the structure that has thus been described, an automatic defrosting action takes place each time the valve 110 is closed. When the valve 110 is thus closed, the mixing valve 45 is so operated so as to feed hot gases to the evaporator 20A and these hot gases serve of course to so heat the tubes of the evaporator 28 that these tubes are defrosted. As an incident to such defrosting action, the hot gases are in a large measure condensed, so that the condensed or liquid refrigerant will act to cool the thermostat 122 and thereby maintain the switch 122A closed. At about the same time, there will be a pressure reduction in the return pipe so as to cause the pressure switch 118A to open. The compressor motor M will, however, continue to operate because the thermostatic switch 122A will have been closed.

When the defrosting action has been completed, the hot gases will pass through the evaporator at a relatively high temperature and there will be no condensed refrigerant to cool the thermostat 122. As a result of this, the thermostat 122 will be heated and the switch 122A will be opened, thereby to de-energize the solenoid 127 and cause the compressor motor M to be stopped. The relay 135 prevents either the thermostat 122 or the pressure switch 118A from starting the compressor unless the thermostat 114 is calling for cooling so that its contacts are closed. When the control thermostat 114 again causes the relay 135 to be energized, and again causes the valve 110 to be opened, the refrigerant will be fed to the evaporator 20A as a mixture of gaseous and liquid refrigerant, and the evaporation of the liquid that is therefore attained will increase pressure in the return line 35 so as to close the pressure switch 118A and again energize the solenoid 127 and cause the compressor motor M to again start into operation.

Thus once the thermostat 114 has energized relay 135, the motor can be started by either thermostat switch 122A or pressure switch 118A. But if thermostat 114 has de-energized relay 135, the motor can be stopped only if both thermostat switches 118A and 122A are opened.

Although a supplemental evaporator 120 is shown in Fig. 4 such an evaporator is required under certain conditions and can be dispensed with under other operating conditions. For example, if the compressor capacity is reduced by cylinder unloaders or other methods well known in the art, the supplemental evaporator 120 is required because it is quite possible for the suction pressure in the frosted evaporator 20A to be sufficiently high that the condensing temperature of the hot vapor supplied to 20A will be above the melting temperature of the frost. In this case, the hot vapor will condense in 20A as previously described, and the supplemental evaporator 120 is required as previously described.

On the other hand if the full capacity of the compressor is maintained during the defrosting cycle, the pressure of the hot vapor in the evaporator 20A can be quite low due to the pressure drop across the restricted inlets in 21A at the entrance to tubes 20A and the large vapor removal capacity of the compressor.

The pressure in the evaporator 20A can be low enough that the condensing temperature of the vapor will be lower than the melting point of the frost on the coil. In this case, the hot vapor will not condense. The hot vapor will only cool to a temperature somewhat above the melting point of the frost. In this manner the frost will be melted without condensing the hot vapor.

In other words the superheat of the vapor will decrease, but condensation of the vapor will not occur.

Consequently in this case, the supplemental evaporator 120 is not required as there is no condensed liquid to be reevaporated.

With the supplemental evaporator 120 omitted, the electric control cycle would be the same as previously described. The thermostat 122A is located at the outlet of the evaporator 20A. As long as frost is present on the outside of evaporator 20A, the vapor leaving would be cool and contacts 122A would keep the compressor operating. As soon as the evaporator 20A was defrosted the temperature of the vapor leaving the evaporator would be much higher, thus causing thermostat 122A to open and stop the compressor.

In the embodiment of the invention shown in Fig. 4 the pressure control 118A and the relay 135 are shown because they are frequently used in the art. However, the system shown in Fig. 4 would work if both the pressure switch 118A and the relay 135 were omitted.

Referring to Fig. 4A, on a rise in temperature the contacts of thermostat 114 are closed resulting in valve 110 being opened and permitting mixing valve 45 to be normally controlled from superheat as hereinbefore described. At the same time the contacts of 114 also energize the solenoid 127 of starter 124 of Fig. 4A, thus starting the compressor motor.

On a fall in temperature the contacts of 114 are opened thus closing valve 110 which causes mixing valve 45 to feed only hot refrigerant gas to the evaporator 20A of Fig. 4 as previously described. However, the solenoid 127 remains energized as long as the contacts of thermostat 122 are closed, and hence the compressor will continue to operate. If there is frost on the outside surface of evaporator 20A of Fig. 4, the hot refrigerant gas will either be cooled or condensed as previously described. As long as the gas is cooled by the melting of the frost, the contacts of thermostat 122 will remain closed. However, after the frost has melted, the hot gas will not be cooled to as low a temperature as previously. The rise in the temperature of the hot gas will cause thermostat 122 to open its contacts. As a result solenoid 127 of starter 124 will be de-energized and the compressor motor will stop. In this manner, the evaporator 20A will be defrosted after each cycle of operation.

The thermostat 114 alone can start the compressor; but the thermostat 114 alone cannot stop the compressor. On the other hand, the thermostat 122 can only stop the compressor; the thermostat 122 cannot start the compressor. The valve 110 is opened and closed only by the opening and closing of the contacts of the thermostat 114. The operation of the valve 110 is not affected by the thermostat 122.

In the embodiments of the invention that have thus far been described, the liquid-vapor ratio of the refrigerant mixture has been governed by the mixing valve 45, but this liquid-vapor may be controlled by other mixing means. Thus in the embodiment of the invention illustrated in Fig. 5 of the drawings, the mixing valve 45 has been eliminated and the requisite variation in the liquid-vapor ratio of the refrigerant mixture is attained through varying control of the condensing rate of the condenser. In this embodiment of this invention, many of the elements of the refrigerating system are the same as in the embodiment as heretofore described, and the same reference characters are used in each instance where the structure is the same. Thus the return header 22A of the evaporator 20A is connected to the compressor 36 by the return pipe 35, and pipes 38 and 39 in series conduct the compressed gases to the condenser 37. The output of the condenser 37 is conducted by a pipe 140 to a collecting chamber 141 and from the chamber 141, a pipe 142 is extended to the distributing header 21A of the evaporator. The pipe 142 has a horizontal inlet end 142A that is disposed about midway in the height of the chamber 141 so that when condensed, liquid refrigerant is present in the chamber 141 to the level indicated at L in Fig. 5, there will be an area of the open end of the pipe 142A that is exposed to the gas that is present in the chamber 141 above the level L. The pressure within the chamber 141 acts to cause gaseous refrigerant to be moved upwardly through the pipe 142 and to the evaporator 20A and liquid refrigerant is entrained in such gaseous refrigerant in varying proportions in accordance with the relationship of the level L to the open end of the pipe 142A. This variation of the level L within the chamber 141 is controlled by varying the condensing rate of the condenser 37. Thus, as will be evident in Fig. 5, the condenser water is conveyed to the condenser 37 through a pipe 144 in which a valve 145 is interposed. The valve 145 is of a conventional bellows-operated type, having a power mechanism 146 associated therewith, and this valve is of the normally open type, and is arranged to be closed when pressure is applied to the operating means 146. Such operating pressure is applied to the power means 146 under control of a thermal expansion valve 80 that is operatively associated with the return line 35 in the manner hereinbefore described. In this instance however, the pressure of the high pressure refrigerant is applied to the power means 146 by relatively small or restricted pipes 147 and 148 that are extended in series from pipe 39 to the power means 146. A pipe 149 extending from the pipe 148 to the inlet of the valve 80 enables the valve 80 to bleed off a portion of the pressure from the high pressure pipe 148, and thus the position of adjustment of the valve 145 is controlled in accordance with the superheat of the refrigerant in the return line. The system that is thus illustrated in Fig. 5 of the drawings operates to control the flow of refrigerant to the evaporator through variations of the liquid-vapor ratio of the refrigerant mixture, and equality of distribution is maintained among the several evaporating tubes of the evaporator by virtue of high pressure that is constantly maintained in the distributing header.

It should be noted that the control valve 45 is particularly effective in attaining uniform and highly satisfactory operation of the system, for this valve 45 assures proper mixture of the liquid and gaseous components of the refrigerant. Thus it will be observed that the gaseous component of the refrigerant enters through the port 65 and passes in an annular sheet or curtain about and downwardly past the annular edge of the valve member 52. The liquid component of the refrigerant is of course fed upwardly out of the opening or port 71 at high pressure and at high velocity and is spread into an annular form by the valve extension or element 52A so as to continue its upward movement till it strikes the lower face of the valve member 52. This serves to break up or atomize the liquid and causes the atomized liquid to be directed radially outwardly and downwardly into the downwardly moving annular curtain of gaseous refrigerant so as to be entrained in the gaseous refrigerant, hence the mixing action is extremely thorough so as to promote uniformity of operation in the system.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a refrigerating system, a compressor affording a source of compressed gaseous refrigerant, a condenser to which compressed gaseous refrigerant is fed from said compressor and affording a source of liquid refrigerant, an evaporator having a distributing supply header and a return header and a plurality of evaporating tubes interconnecting said headers, means affording restricted inlets from said supply header to each of said evaporating tubes, a return connection from said return header to said compressor, and means responsive to the superheat of the refrigerant in said return connection for feeding a mixture of liquid and gaseous refrigerant to said supply header in different proportions in accordance with such superheat.

2. In a refrigerating system, a compressor affording a source of compressed gaseous refrigerant, a condenser to which compressed gaseous refrigerant is fed from said compressor and affording a source of liquid refrigerant, an evaporator having a distributing spply header and a return header and a plurality of evaporating tubes interconnecting said headers, means affording restricted inlets from said supply header to each of said evaporating tubes, a return connection from said return header to said compressor, mixing means having separate inlet connections respectively from said source of gaseous refrigerant and said source of liquid refrigerant, said mixing means having an outlet connection with said supply header, and control means responsive to the superheat of the refrigerant in said return line to vary the ratio of liquid and gaseous refrigerant fed to said supply header.

3. In a refrigerating system, a compressor affording a source of compressed gaseous refrigerant, a condenser to which compressed gaseous refrigerant is fed from said compressor and affording a source of liquid refrigerant, an evaporator having a distributing supply header and a return header and a plurality of evaporating tubes interconnecting said headers, means affording restricted inlets from said supply header to each of said evaporating tubes, a return connection from said return header to said compressor, an adjustable mixing valve having separate inlet connections respectively from said source of gaseous refrigerant and said source of liquid refrigerant, said mixing valve having an outlet connection with said supply header and having a valve member adjustable to vary the ratio of liquid and gaseous refrigerant fed to said supply header, and means responsive to the superheat of the gaseous refrigerant in said return line for adjusting said valve member.

4. In a refrigerating system, a compressor affording a source of compressed gaseous refrigerant, a condenser to which compressed gaseous refrigerant is fed from said compressor to be condensed, an evaporator having a distributing supply header and a return header and a plurality of evaporating tubes interconnecting said headers and having means affording restricted inlets from said supply header to each of said evaporating tubes, a return connection from said return header to said compressor, means affording a connection from said condenser to said supply header for conveying refrigerant at substantially condenser pressure to said supply header, means for varying the condensing action of said condenser, and means operable to actuate said varying means and responsive to the superheat of the refrigerant in said return connection to thereby feed a mixture of liquid and gaseous refrigerant to said supply header in different proportions in accordance with such superheat.

5. In a refrigerating system, a compressor affording a source of compressed gaseous refrigerant, a condenser to which compressed gaseous refrigerant is fed from said compressor and affording a source of liquid refrigerant, an evaporator having a distributing supply header and a return header and a plurality of evaporating tubes interconnecting said headers, means affording resricted inlets from said supply header to each of said evaporating tubes, a return connection from said return header to said compressor, mixing means having separate inlet connections respectively from said source of gaseous refrigerant and said source of liquid refrigerant, said mixing means having an outlet connection with said supply header, a first control means for said mixing means responsive to the superheat of the refrigerant in said return line to vary the ratio of liquid and gaseous refrigerant fed to said supply header, a second control means responsive to the cooling action of said evaporator for governing said first control means to cause said mixing means to feed only gaseous refrigerant to said evaporator, pressure responsive means associated with said return line, and compressor control means operable by said pressure responsive means to stop said compressor upon a predetermined reduction in pressure in said return line and to start said compressor upon a predetermined increase in such pressure.

6. In a refrigerating system, a compressor affording a source of compressed gaseous refrigerant, a condenser to which compressed gaseous refrigerant is fed from said compressor and affording a source of liquid refrigerant, an evaporator having a distributing supply header and a return header and a plurality of evaporating tubes interconnecting said headers and means affording restricted inlets from said supply header to each of said evaporating tubes, a return connection from said return header to said compressor, mixing means having separate inlet connections respectively from said source of gaseous refrigerant and said source of liquid refrigerant, said mixing means having an outlet connection with said supply header, a first control means for said mixing means responsive to the superheat of the refrigerant in said return line to vary the ratio of liquid and gaseous refrigerant fed to said supply header, a second control means responsive to the cooling action of said evaporator for governing said first control means to cause said mixing means to feed only gaseous refrigerant to said evaporator, pressure responsive means associated with said return line, compressor control means operable by said pressure responsive means to stop said compressor upon a predetermined reduction in pressure in said return line and to start said compressor upon a predetermined increase in such pressure, and a thermostat associated with said return header and operable to dominate said pressure responsive means to maintain said compressor in operation so long as defrosting of said evaporator is functioning to cause cooling of the gaseous refrigerant thus supplied to said evaporator.

7. In a refrigerating system, a compressor affording a source of compressed gaseous refrigerant, a condenser to which compressed gaseous refrigerant is fed from said compressor and affording a source of liquid refrigerant, an evaporator having a distributing supply header and a return header and a plurality of evaporating tubes interconnecting said headers, means affording restricted inlets from said supply header to each of said evaporating tubes, a return connection from said return header to said compressor, mixing means having separate inlet connections respectively from said source of gaseous refrigerant and said source of liquid refrigerant, said mixing means having an outlet connection with said supply header, a first control means for said mixing means and controlling said mixing means in response to the superheat of the refrigerant in said return line to vary the ratio of liquid and gaseous refrigerant fed to said supply header, a second control means responsive to the cooling action of said evaporator for governing said first control means to cause said mixing means to feed only gaseous refrigerant to said evaporator, pressure responsive means associated with said return line, compressor control means operable by said pressure responsive means to stop said compressor upon a predetermined reduction in pressure in said return line and to start said compressor upon a predetermined increase in such pressure, a thermostat associated with said return header and operable to dominate said pressure responsive means to maintain said compressor in operation so long as defrosting of said evaporator is functioning to cause cooling of the gaseous refrigerant thus supplied to said evaporator, and a supplemental evaporator interposed between said return header and said return line to evaporate the refrigerant condensed in the course of such a defrosting operation.

8. In a refrigerating system, a compressor affording a source of compressed gaseous refrigerant, a condenser to which compressed gaseous refrigerant is fed from said compressor and affording a source of liquid refrigerant, an evaporator having a distributing supply header and a return header and a plurality of evaporating tubes interconnecting said headers, means affording restricted inlets from said supply header to each of said evaporating tubes, a return connection from said return header to said compressor, mixing means having separate inlet connections respectively from said source of gaseous refrigerant and said source of liquid refrigerant, said mixing means having an outlet connection with said supply header, a first control means for said mixing means responsive to the superheat of the refrigerant in said return line to vary the ratio of liquid and gaseous refrigerant fed to said supply header, and a second control means responsive to the cooling action of said evaporator for governing said first control means to cause said mixing means to feed only gaseous refrigerant to said evaporator.

9. In a refrigerating system, a compressor affording a source of compressed gaseous refrigerant, a condenser to which compressed gaseous refrigerant is fed from said compressor and affording a source of liquid refrigerant, an evaporator having a distributing supply header and a return header and a plurality of evaporating tubes interconnecting said headers, means affording restricted inlets from said supply header to each of said evaporating tubes, a return connection from said return header to said compressor, mixing means having separate inlet connections respectively from said source of gaseous refrigerant and said source of liquid refrigerant, said mixing means having an outlet connection with said supply header, a first control means for said mixing means responsive to the superheat of the refrigerant in said return line to vary the ratio of liquid and gaseous refrigerant fed to said supply header, a second control means responsive to the cooling action of said evaporator for causing said mixing means to feed only gaseous refrigerant to said evaporator, and control means to stop and start said compressor.

10. In a refrigerating system, a compressor affording a source of compressed gaseous refrigerant, a condenser to which compressed gaseous refrigerant is fed from said compressor and affording a source of liquid refrigerant, an evaporator having a distributing supply header and a return header and a plurality of evaporating tubes interconnecting said headers and means affording restricted inlets from said supply header to each of said evaporating tubes, a return connection from said return header to said compressor, mixing means having separate inlet connections respectively from said source of gaseous refrigerant and said source of liquid refrigerant, said mixing means having an outlet connection with said supply header, a first control means for said mixing means responsive to the superheat of the refrigerant in said return line to vary the ratio of liquid and gaseous refrigerant fed to said supply header, a second control means responsive to the cooling action of said evaporator for causing said mixing means to feed only gaseous refrigerant to said evaporator, pressure responsive means associated with said return line, compressor control means operable to start and stop said compressor, and means associated with said return header and operable to dominate said compressor control means to maintain said compressor in operation so long as defrosting of said evaporator is functioning to cause cooling of the gaseous refrigerant thus supplied to said evaporator.

11. In a refrigerating system, a compressor affording a source of compressed gaseous refrigerant, a condenser to which compressed gaseous refrigerant is fed from said compressor and affording a source of liquid refrigerant, an evaporator having a distributing supply header and a return header and a plurality of evaporating tubes interconnecting said headers, means affording restricted inlets from said supply header to each of said evaporating tubes, a return connection from said return header to said compressor, mixing means having separate inlet connections respectively from said source of gaseous refrigerant and said source of liquid refrigerant, said mixing means having an outlet connection with said supply header, a first control means for said mixing means and controlling said mixing means in response to the superheat of the refrigerant in said return line to vary the ratio of liquid and gaseous refrigerant fed to said supply header, a second control means responsive to the cooling action of said evaporator for causing said mixing means to feed only gaseous refrigerant to said evaporator, compressor control means operable to start and stop said compressor, and a thermostat associated with said return header and operable to dominate said compressor control means to maintain said compressor in operation so long as defrosting of said evaporator is functioning to cause cooling of the gaseous refrigerant thus supplied to said evaporator.

12. In a refrigerating system, a compressor affording a source of compressed gaseous refrigerant, a condenser to which compressed gaseous refrigerant is fed from said compressor and affording a source of liquid refrigerant, an evaporator having a distributing supply header and a return header and a plurality of evaporating tubes interconnecting said headers, means affording restricted inlets from said supply header to each of said evaporating tubes, a return connection from said return header to said compressor, mixing means having separate inlet connections respectively from said source of gaseous refrigerant and said source of liquid refrigerant, said mixing means having an outlet connection with said supply header, a first control means for said mixing means responsive to the superheat of the refrigerant in said return line to vary the ratio of liquid and gaseous refrigerant fed to said supply header, and a second control means responsive to the cooling action of said evaporator for causing said mixing means to feed only gaseous refrigerant to said evaporator.

13. In a refrigerating system, a first means affording a source of compressed gaseous refrigerant, a condenser to which compressed gaseous refrigerant is fed from said source and affording a source of liquid refrigerant, an evaporator having a distributing supply header and a return header and a plurality of evaporating tubes interconnecting said headers, means affording restricted inlets from said supply header to each of said evaporating tubes, mixing means having a substantially unrestricted input connection from said source of liquid refrigerant and a substantially unrestricted input connection from said source of gaseous refrigerant, and a substantially unrestricted output connection with said supply header for feeding a mixture of liquid and gaseous refrigerant to said supply header at substantially condenser pressure, and a return connection from said return header to said first means.

14. In a refrigerating system, a first means affording a source of compressed gaseous refrigerant, a condenser to which compressed gaseous refrigerant is fed from said source and affording a source of liquid refrigerant, an evaporator having a distributing supply header and a return header and a plurality of evaporating tubes interconnecting said headers, means affording restricted inlets from said supply header to each of said evaporating tubes, a return connection from said return header to said first means, and means responsive to the refrigeration load on said evaporator for feeding a mixture of liquid and gaseous refrigerant to said supply header at substantially condenser pressure and in different proportions in accordance with such load.

15. In a refrigerating system, an evaporator having a distributing supply header and a return header and a plurality of evaporating tubes interconnecting said headers, means affording restricted inlets from said supply header to each of said evaporating tubes, refrigerant supply means connected with said supply header for delivering liquid or gaseous refrigerant or a mixture of thereof to the supply header, a first control means for said refrigerant supply means responsive to the superheat of the refrigerant in said return line to vary the ratio of liquid and gaseous refrigerant fed to said supply header, and a second control means responsive to the cooling action of said evaporator to cause said refrigerant supply means to feed only gaseous refrigerant to said evaporator.

16. In a variably settable refrigerant mixing valve for mixing liquid and gaseous refrigerant to afford a homogeneous gas-liquid dispersion, the combination of a hollow valve body formed to afford a gas inlet chamber and a mixing chamber separated by a gas port through which gas may pass from said gas inlet chamber into said mixing chamber, means affording an outlet spaced from said gas port, means affording a liquid inlet passage extending into said mixing chamber and terminating in a liquid discharge port disposed within said mixing chamber between said outlet and said gas port and facing toward said gas port, and valve means shiftably disposed between said ports and affording surfaces against which a liquid refrigerant discharged from said liquid port must strike to be broken up and atomized as such liquid meets a stream of gaseous refrigerant discharged into said mixing chamber from said gas port.

17. In a refrigerating system, a compressor affording a source of compressed gaseous refrigerant, a condenser to which compressed gaseous refrigerant is fed from said compressor and affording source of liquid refrigerant, an evaporator having a distributing supply header and a return header and a plurality of evaporating tubes interconnecting said headers, means affording restricted inlets from said supply header to each of said evaporating tubes, a return connection from said return header to said compressor, means for feeding a mixture of liquid and gaseous refrigerant to said supply header at substantially condenser pressure, and means governing said last mentioned means and operable in accordance with the refrigeration load for varying the ratio of liquid and gaseous refrigerant fed to said supply header.

References Cited in the file of this patent

UNITED STATES PATENTS

| | | |
|---|---|---|
| 1,480,126 | Sullivan | Jan. 8, 1924 |
| 2,080,358 | Kucher | May 11, 1937 |
| 2,158,792 | Erback | May 16, 1939 |
| 2,163,591 | Deverall | June 27, 1939 |
| 2,206,957 | Hose | July 9, 1940 |
| 2,252,300 | McGrath | Aug. 12, 1941 |
| 2,434,593 | Schulz et al. | Jan. 13, 1948 |
| 2,443,500 | Goddard | June 15, 1948 |
| 2,540,550 | Schulz et al. | Feb. 6, 1951 |